Sept. 1, 1936.  J. GATTONI  2,053,074

PRECISION BALANCE

Filed Feb. 2, 1934  3 Sheets-Sheet 1

INVENTOR
JOHN GATTONI
BY
ATTORNEY

Sept. 1, 1936. J. GATTONI 2,053,074
PRECISION BALANCE
Filed Feb. 2, 1934 3 Sheets-Sheet 2
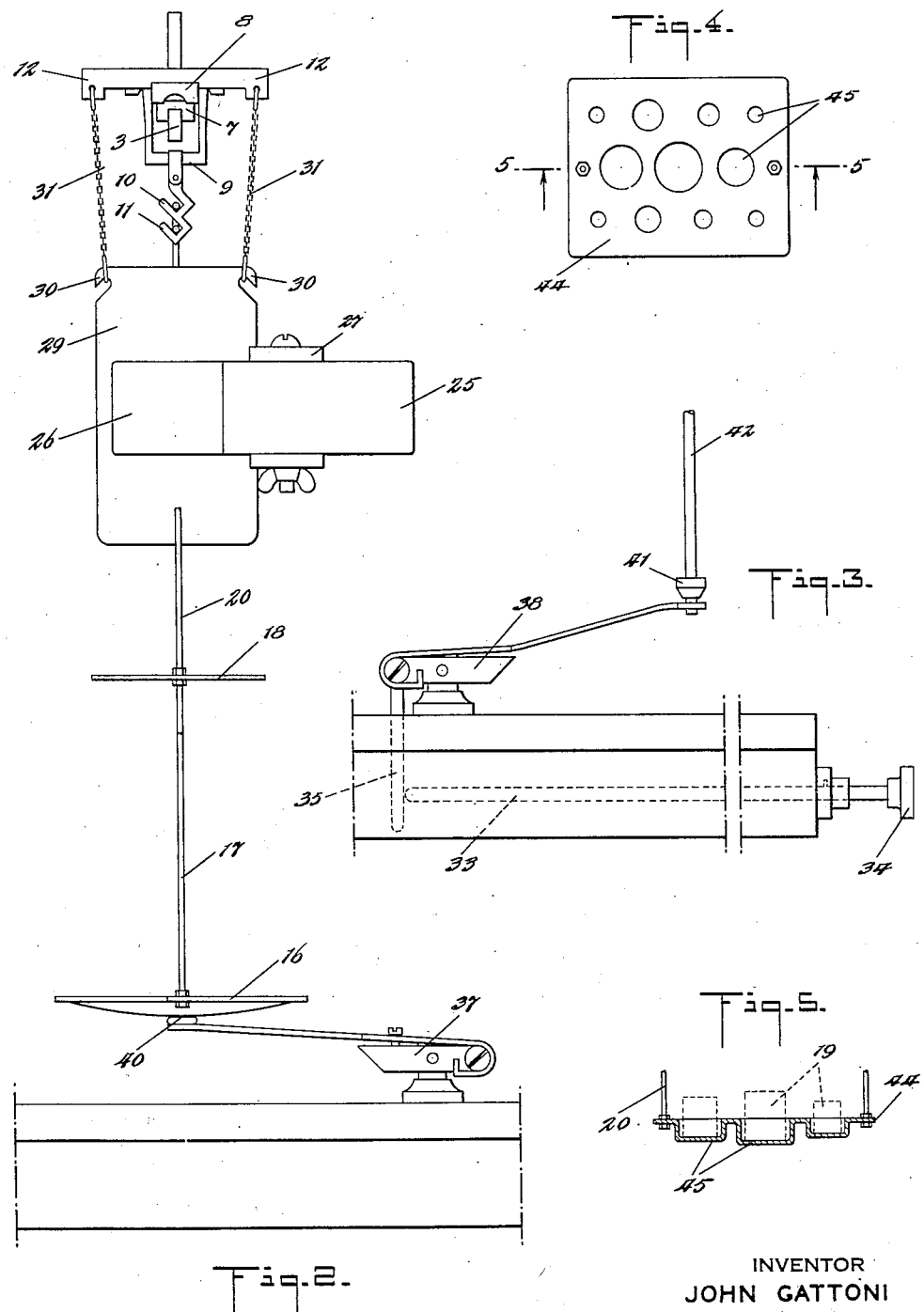
INVENTOR
JOHN GATTONI
BY
ATTORNEY

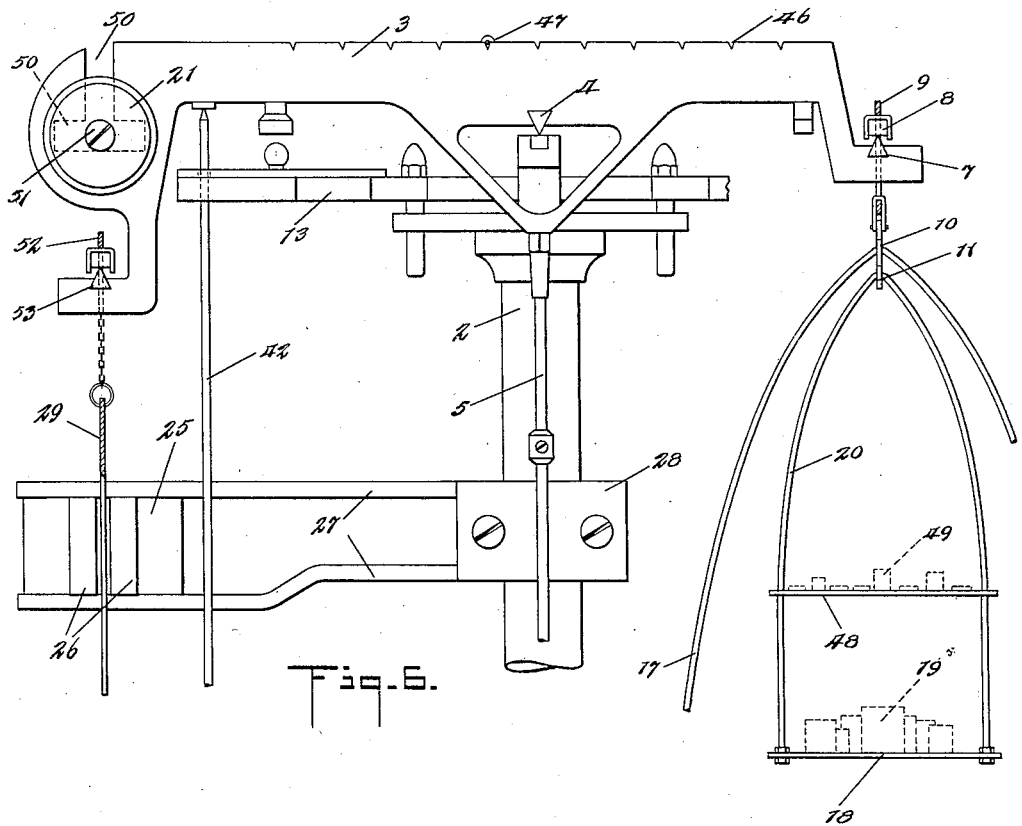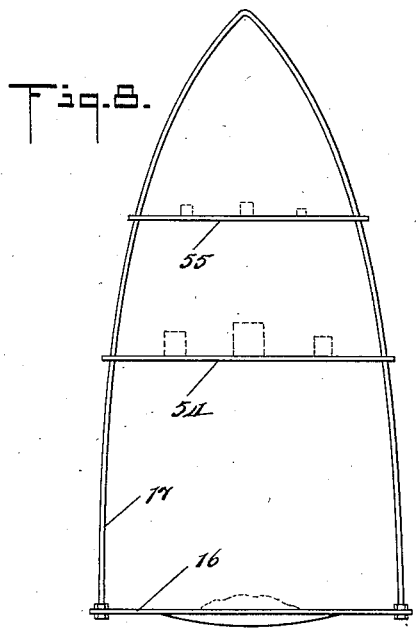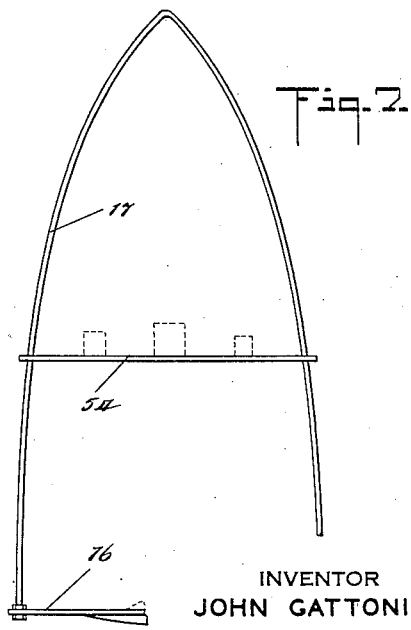

Patented Sept. 1, 1936

2,053,074

UNITED STATES PATENT OFFICE 2,053,074

PRECISION BALANCE

John Gattoni, Union City, N. J., assignor to Seederer-Kohlbusch, Inc., Jersey City, N. J., a corporation of New Jersey Application February 2, 1934, Serial No. 709,427

4 Claims. (Cl. 265—54)

This invention relates to precision balances and has for its object to provide a balance of this type with improved means for quickly and accurately weighing objects of relatively small mass.

My balance is of the type employing a beam of any suitable length pivoted on a knife edge. On one side of the knife edge the beam carries a pan or a plurality of pans or other means for supporting the substance to be weighed as well as a set of weights of known value; and on the other side of the knife edge the beam is weighted so that it is exactly balanced when loaded with the known weights but before the substance to be weighed is placed on the weighing pan. The substance to be weighed is then placed on the pan, upsetting the equilibrium of the beam, and various known weights are removed until the equilibrium of the beam is restored, the weight of the substance being the combined value of the weights which have been removed in order to balance the beam.

My invention resides in the provision of improved means for adjusting the equilibrium of a balance of this type and for arresting and releasing the beam and pans so as to increase the accuracy and speed of weighing.

The various features and advantages of the invention will be described in connection with the accompanying drawings, in which:

Fig. 2 is a view looking into the right end of the balance;

Fig. 3 is a view looking into the left end of the balance;

Fig. 4 is a plan view of a modified weight plate;

Fig. 5 is a section taken on line 5—5 of Fig. 4;

Fig. 6 is a front elevation showing various modifications of the invention; and

Figs. 7 and 8 are details of further modifications.

Figure 1:
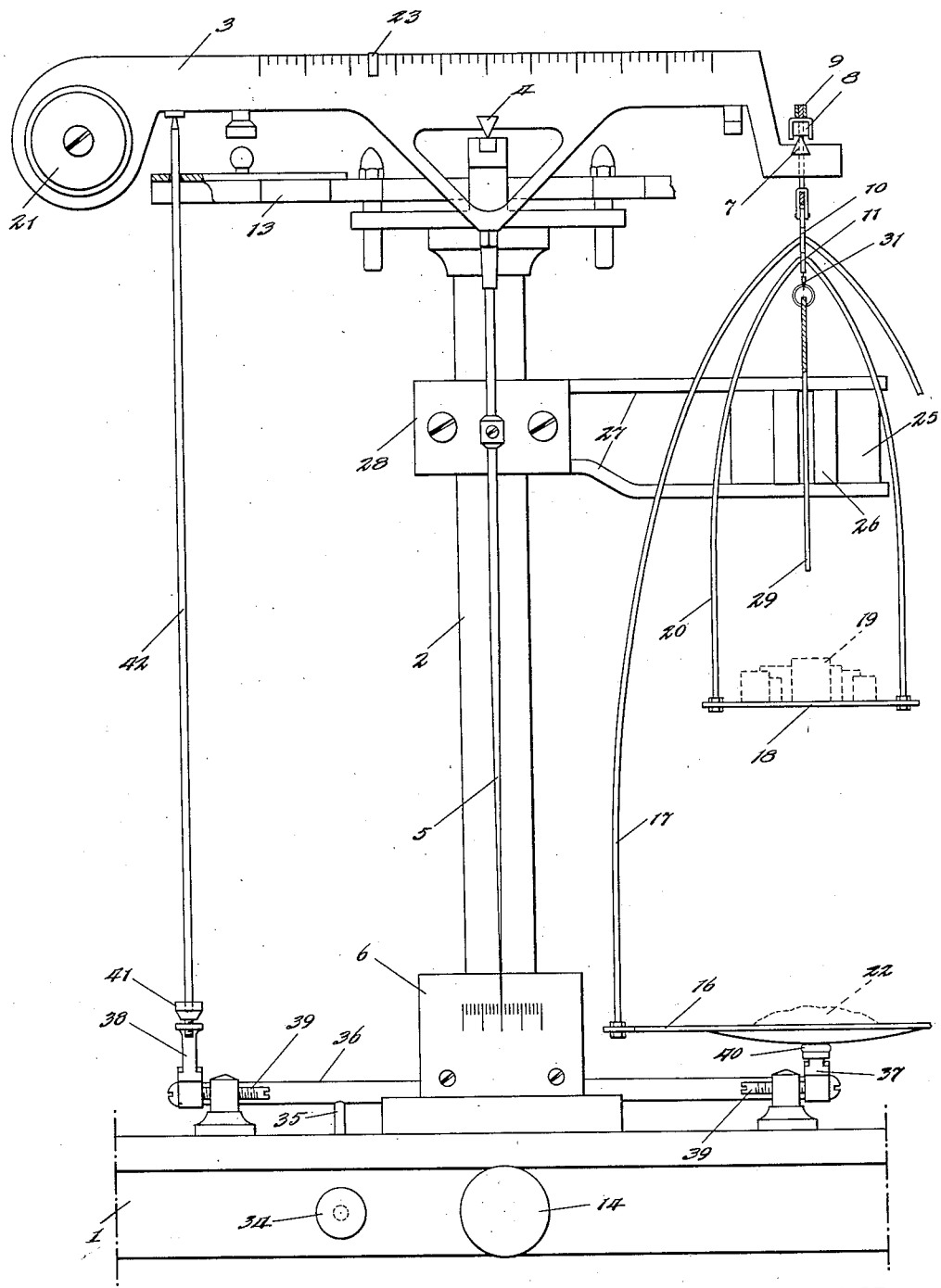
Fig. 1 is a front elevation of a balance embodying the invention.

The balance shown in Figs. 1 to 3 has a base 1 which in practice supports a glass case enclosing the entire mechanism. The base supports standard 2 at the upper end of which beam 3 is mounted on knife edge 4. The beam carries the usual pointer 5 which moves over scale 6.

At one end of beam 3 is a knife edge 7 on which rests bearing 8 of yoke frame 9. The yoke frame has two hooks 10 and 11 and lateral extensions 12 as shown in Figs. 1 and 2. Standard 2 also supports cradle 13 which is raised and lowered by rotation of knob 14 for the purpose of lifting beam 3 and yoke frame 9 off their respective knife edge bearings when the balance is not in use.

The pan 16 for the substance to be weighed is supported by bow 17 which is hung on the upper hook 10 of the yoke frame, and a second pan or plate 18 for a set of weights 19 is supported by a smaller bow 20 which is hung on the lower hook 11 of the yoke frame. Thus the single knife edge 7 at one end of beam 3 supports the complete set of weights 19 of predetermined value, in addition to supporting the pan in which the substance to be weighed is placed. This initial load is exactly balanced by a spool-shaped counterweight 21 which is screwed or otherwise mounted on the opposite end of beam 3 so that the beam is in a state of equilibrium when pan 16 is empty and when the weights 19 are mounted on plate 18.

Weighing is accomplished by placing a substance such as 22 in pan 16, thereby upsetting the equilibrium of the beam, and by removing a weight or various combinations of weights 19 from plate 18 until the beam again attains a state of equilibrium with pointer 5 at the center or zero line of scale 6. In order to balance the beam in this manner the total value of the weight or weights 19 removed from plate 18 must exactly equal the weight of the substance 22 on pan 16. The weights 19 are suitably labeled so that, by adding the weights removed from plate 18, the weight of substance 22 is obtained. If desired, beam 3 may be graduated to take all milligram weights, and in some cases gram weights, as in any analytical balance, a sliding poise 23 being shown in Fig. 1 for purposes of illustration.

The balance may also be provided with a magnetic damper of the type disclosed in my Patent #1,900,641, dated March 7, 1933. In the form shown, magnet 25 having closely spaced poles 26 is supported by arms 27 which are adjustably secured to standard 2 by clamp 28. An aluminum or other non-magnetic damping plate 29 is pivotally suspended by hooks 30 and light chains 31 from extensions 12 of yoke frame 9 and is arranged to move up and down between the poles of the magnet, swinging movements of bows 17 and 20 being isolated from the damping plate so that they do not affect the sensitivity and accuracy of the balance. The eddy currents set up by moving plate 29 through the magnetic field dampen the motion of the beam and bring the balance to rest in a few seconds.

Plunger 33 is operated by knob 34 in front of the balance. Thus plunger contacts with a pin 35 carried by bar 36 having lateral arms 37 and 38 which are mounted in pivots 39 on base 1. Arm 37 carries a rest 40 which is adapted to contact with the bottom of pan 16 as shown in Figs. 1 and 2. Arm 38 carries a cup 41 supporting rod 42 which passes through an opening in cradle 13 and provides a rest for the end of the beam adjacent weight 21. The weight of bar 36 holds the respective rests 40 and 42 in contact with pan 16 and beam 3 as in Fig. 1, and the pressure of pin 35 on plunger 33 forces the plunger outwardly or toward the right as viewed in Fig. 3. When plunger 33 is pushed back, the pressure of the plunger on pin 35 raises bar 36 and tips arms 37 and 38 toward the front of the balance thereby lowering rest 40 out of contact with pan 16 and permitting rest 42 to descend by gravity out of the path of beam 3. When thus pushed back, plunger 33 may be locked in any suitable manner as by a pin engaging the adjacent edge of the base when the plunger is rotated.

Figs. 4 and 5 show a modified weight plate 44 supported by bow 20 and containing a plurality of depressions or compartments 45 of various widths and depths to receive the different weights 19. In the form shown, compartments 45 are of circular cross-section and are adapted to accommodate standard cylindrical weights, but they may be of any other suitable shape and a single compartment may accommodate a number of fractional weights if desired.

Fig. 6 shows a number of other modifications. In this embodiment beam 3 has a series of graduated notches 46 for the reception of a rolling poise 47. Bow 20, which carries weight plate 18 also carries a second superposed plate 48 for a set of fractional weights 49, it being understood that the fractional weights may be placed either above or below the main weights. Intersecting vertical and horizontal slots 50 are formed in the opposite end of the beam for the ready reception of the spool-shaped counterweight 21 comprising two discs which are connected by a screw 51, enabling said counterweight to be held in any desired position in said slots by tightening screw 51. Also, in this embodiment of the invention, magnet 25 is mounted on the left side of standard 2 and cooperating damping plate 29 is suspended from a separate yoke frame 52 supported by knife edge 53 which is carried by the end of the beam adjacent the counterweight. The knife edge 53 does not constitute a friction point within the ordinary meaning of the term because it cannot affect the sensitivity of the balance.

In Figs. 7 and 8, instead of providing a separate suspension for the weight plates, these plates are mounted on the bow 17 above pan 16. In Fig. 7 a single weight plate 54 is carried by bow 17, while in Fig. 8 two weight plates 54 and 55 are shown.

It will be seen that arm ratio is of no importance and may be entirely disregarded in my balance as there are only two knife edges; hence changes in arm length due to temperature, inequalities in the density of the beam material, etc., have no effect on the weighing accuracy of the balance. It is likewise evident that the balance will maintain unvarying sensitiveness from no load to capacity since the full load (the known weights) is always suspended from the beam.

The invention is also capable of many other modifications and adaptations not specifically described but included within the scope of the appended claims.

The invention claimed is:

1. A balance comprising a pivoted beam, means for weighting one end of said beam, means carried by the other end of said beam for supporting a plurality of weights and the substance to be weighed, a vertically movable rod adapted to engage the weighted end of said beam a pivoted arm supporting said rod, and means for moving said arm about its pivot to move said rod into and out of engagement with said beam.

2. A balance comprising a pivoted beam, means for weighting one end of said beam, a pan having a bow suspended from the other end of said beam to support the substance to be weighed, means for supporting a plurality of weights from the same end of the beam as said pan, a movable rest adapted to engage said pan, a vertically disposed axially reciprocal rod adapted to engage the weighted end of said beam, and means for moving said rest and said rod into and out of engagement with said pan and said beam.

3. A balance comprising a pivoted beam having intersecting vertical and horizontal slots at one end for receiving a weight, a spool-shaped weight insertable into said slots and comprising a pair of discs and a connecting screw for locking same in any desired position in said slots, and means carried by the other end of said beam for supporting a plurality of weights and the substance to be weighed.

4. A balance comprising a pivoted beam, means for weighting one end of said beam, a pan having a bow suspended from the other end of said beam to support the substance to be weighed, means for supporting a plurality of weights from the same end of the beam as said pan, a vertically movable cradle beneath said beam for supporting same when not in use, a bar pivoted beneath said beam carrying a pair of spaced arms, a rest carried by one of said arms adapted to engage said pan, a rod supported by the other arm and extending loosely through said cradle in position to engage the weighted end of said beam, and means for moving said bar about its pivot to move said rest and rod into and out of engagement with said pan and beam.

JOHN GATTONI.